(12) United States Patent
Hwang et al.

(10) Patent No.: US 7,975,995 B2
(45) Date of Patent: Jul. 12, 2011

(54) ENGINE MOUNT OF VEHICLE

(75) Inventors: Ji-Soo Hwang, Seoul (KR);
Gyeong-Min Ryu, Daegu-shi (KR)

(73) Assignees: Hyundai Motor Company, Seoul (KR);
Pyung Hwa Industrial Co., Ltd.,
Daegu-Shi (KR)

( * ) Notice: Subject to any disclaimer, the term of this patent is extended or adjusted under 35 U.S.C. 154(b) by 0 days.

(21) Appl. No.: 12/847,667

(22) Filed: Jul. 30, 2010

(65) Prior Publication Data

US 2011/0133375 A1     Jun. 9, 2011

(30) Foreign Application Priority Data

Dec. 4, 2009  (KR) ................. 10-2009-0119758

(51) Int. Cl.
*F16F 5/00* (2006.01)
(52) U.S. Cl. ................................. 267/140.13
(58) Field of Classification Search ... 267/140.13–141.7
See application file for complete search history.

(56) References Cited

U.S. PATENT DOCUMENTS

| 4,274,654 | A | * | 6/1981 | Travaglio | 280/124.154 |
| 4,484,670 | A | * | 11/1984 | Axthammer et al. | 188/322.19 |
| 7,341,243 | B2 | * | 3/2008 | Yamamoto et al. | 267/140.13 |
| 7,350,776 | B2 | | 4/2008 | Muramatsu et al. | |
| 2005/0206056 | A1 | * | 9/2005 | Maeno et al. | 267/140.13 |

FOREIGN PATENT DOCUMENTS

| JP | 8-226487 A | 9/1996 |
| JP | 2004-293607 A | 10/2004 |
| KR | 1999-0040575 | 6/1999 |

* cited by examiner

*Primary Examiner* — Christopher P Schwartz
(74) *Attorney, Agent, or Firm* — Morgan, Lewis & Bockius LLP

(57) ABSTRACT

An engine mount of a vehicle may include a main rubber body defining a main liquid chamber, wherein a fastening bolt for assembling a vehicle engine is coupled to the main rubber body, an inner case supporting the main rubber body, and a housing enclosing the main rubber and the inner case, wherein at least a protrusion is formed on an outer circumference of the inner case, and wherein at least a groove is formed in the housing and the at least a protrusion of the inner case is coupled to the corresponding at least a groove of the housing.

8 Claims, 3 Drawing Sheets

ENGINE MOUNT OF VEHICLE

The present application claims priority to Korean Patent Application No. 10-2009-0119758, filed on Dec. 4, 2009, the entire contents of which is incorporated herein for all purposes by this reference.

BACKGROUND OF THE INVENTION

1. Field of the Invention

The present invention relates to an engine mount of a vehicle which reduces vibration generated by the operation of an engine, in more detail, an engine mount of a vehicle including a main rubber body in which a fastening bolt for assembling a vehicle engine is inserted, an inner case supporting the main rubber body and combined with the main rubber body, and a housing connected to the outer side of the inner case and defining the external appearance of the engine mount, in which at least one or more protrusions are formed on the outer circumference of the inner case, at least one or more insertion grooves where the protrusions are inserted are formed in the housing, and the protrusions of the inner case are inserted in the insertion grooves of the housing to improve strength and durability.

2. Description of Related Art

In general, an engine mount is a device reducing vibration generated by the operation of an engine and the operation is as the following.

That is, high-frequency vibration with small amplitude or large amplitude which is generated while a vehicle travels is transmitted to the engine mount and fluid in the engine mount repeatedly flows up and down therein by contraction and restoration of a main rubber body disposed in the engine mount, such that the vibration energy of the engine is reduced.

FIG. 1 is an engine mount of the related art, in which the engine mount includes a housing 1 defining the outer body of the engine mount, a main rubber body 2, and a body 6 fixing the main rubber body 2 and having an elastic diaphragm 7 at the lower portion.

Further, a main liquid chamber 4 that is a space in which fluid flows is formed at the lower portion of the main rubber body 2 and a fastening bolt 3 is inserted in the upper portion of the main rubber body 2 to fasten the engine mount to the engine.

In the assembly structure of the engine mount having the above configuration, a hook-shaped curling portion 1a is formed at the lower portion of the housing 1, such that the end of the body 6 and the engine mount are combined with a car body frame (not shown) inside the curling portion 1a and a bracket 5 with a locking prominence at the end is inserted therein such that the housing 1, the body 6, and the bracket 5 are assembled.

According to the assembly structure of the engine mount having the above structure in the related art, when a strong external shock is applied to a vehicle due to a collision etc., the bracket 5 held by the curling portion 1a may be separated from the housing 1 by the external shock.

Further, in addition to separation of the bracket 5 due to an external shock described above, the housing 1 and the bracket 5 may be corroded by moisture flowing in a small gap in the curling portion 1a.

On the other hand, as the engine mount described above, Japanese Patent Application Laid-Open No. H08-226487 discloses an engine mount formed by integrally pressing a pair of main body plates and one sheet to the lower end of each of main the body plates.

However, the invention disclosed in Japanese Patent Application Laid-Open No. H08-226487 has a structure in which only one sheet is pressed to the lower end of the main body plate, such that it is vulnerable to an external shock, such as a collision of vehicles, and the engine mount is not sufficiently fixed.

Further, Japanese Patent Application Laid-Open No. 2004-293607 discloses an engine mount in which a first fitting device and a second fitting device are disposed apart from each other at an opening of one side of a bracket, a cocking portion of the bracket is integrally formed, and a circular fitting device is disposed at the outer circumference.

However, the invention disclosed in Japanese Patent Application Laid-Open No. 2004-293607 requires many components for assembling the engine mount, such as the first fitting device, the second fitting device, the cocking portion, and the circular fitting device, such that the assembly structure is complicated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an engine mount that can be firmly fixed against an external shock applied to a vehicle, has improved durability by preventing the engine mount from being corroded by water etc. flowing inside, and makes it possible to increase productivity by simplifying the assembly structure.

According to an aspect of the present invention, the engine mount of a vehicle may include a main rubber body defining a main liquid chamber, wherein a fastening bolt for assembling a vehicle engine is coupled to the main rubber body, an inner case supporting the main rubber body, and a housing enclosing the main rubber and the inner case, wherein at least a protrusion is formed on an outer circumference of the inner case, and wherein at least a groove is formed in the housing and the at least a protrusion of the inner case is coupled to the corresponding at least a groove of the housing.

A curling portion having a support prominence may be, at a lower portion of the housing, formed by bending a distal end of the housing inwards, and a diaphragm may be locked to the support prominence of the curling portion and the inner case.

The engine mount of a vehicle may further include a nozzle plate including a nozzle to allow fluid to flow between the main liquid chamber and a supplementary fluid chamber formed between the diaphragm and the nozzle plate, wherein the nozzle plate is attached to a lower portion of the inner case and the diaphragm is attached to a lower portion of the nozzle plate to form the supplementary fluid chamber.

The inner case may include a locking step at the lower portion along an inner circumference thereof and the nozzle plate is coupled to the locking step of the inner case.

A ring plate may be attached to an outer circumference of the diaphragm, enclose a distal end of the inner case and be locked between the support prominence of the curling portion and the inner case.

A locking prominence may be formed at the lower portion of the inner case, the ring plate may include a first hook bending upwards and then bending inwards, and the diaphragm connected to the ring plate may be coupled to the inner case by inserting the first hook of the ring plate between the support prominence of the housing and the locking prominence of the inner case.

The locking prominence may be formed to extend outwards toward the curling portion of the housing in a predetermined length.

The ring plate may include a second hook protruding upwards and the nozzle plate includes a locking groove along an outer circumference thereof into which the second hook of the ring plate is coupled.

At least a bracket that is fixed to a frame of the vehicle may be formed at the housing.

The engine amount of the present invention has the following advantages.

First, since the engine mount is combined in a cocking way by the insertion grooves formed in the housing and the protrusions formed in the inner case, it is possible to firmly fix the engine mount by preventing it from easily separated by an external shock, such as a collision of vehicles.

Second, since the engine mount is further combined by the curling portion at the lower portion of the housing, in addition to the cocking combination by the insertion grooves and the protrusions, it is possible more firmly fix the engine mount and preclude corrosion of the housing and brackets by preventing water etc. from flowing into the curling portion of the housing.

Third, since the ring plate and the diaphragm are integrally attached to the lower portion of the body, water or pollutants are basically prevented from flowing into lower portion of the ring plate, thereby improving durability.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
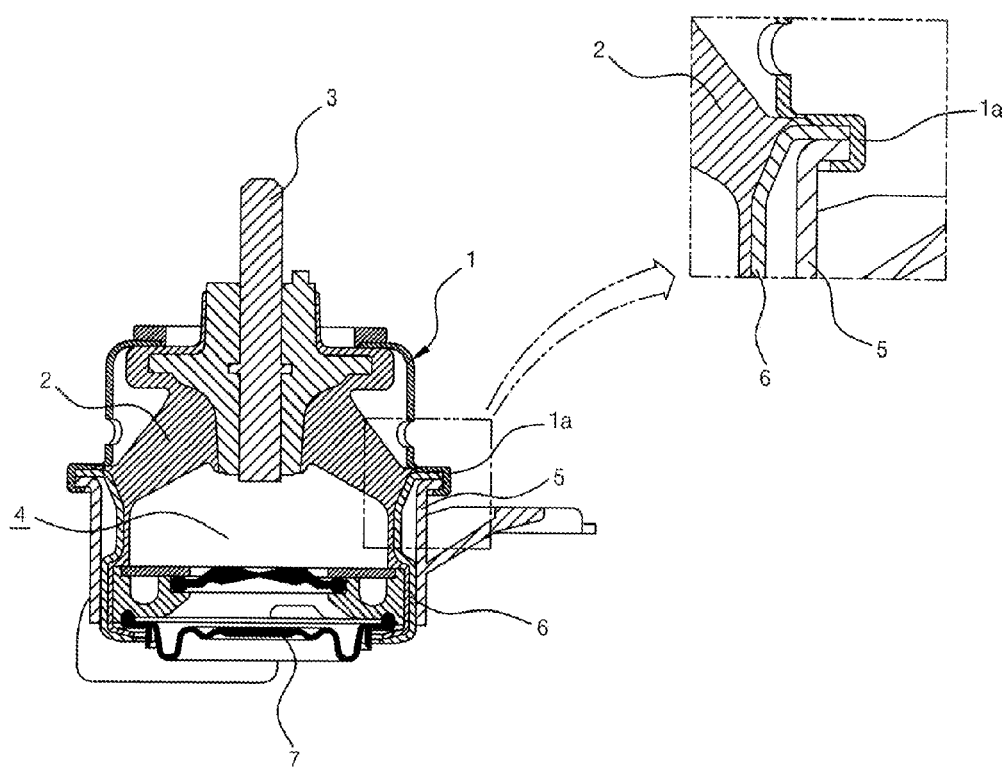
FIG. 1 is a cross-sectional view of an engine mount of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The configuration of an engine mount according to an exemplary embodiment of the present invention is described in detail with the accompanying drawings.

It should be understood, however, that the given drawings are provided as examples for sufficiently communicating the spirit of the present invention to those skilled in the art. Therefore, the present invention is not limited to the drawings and may be implemented in other ways.

Terminologies used herein, if not specifically stated, have the meanings that those skilled in the art understand, and the detailed description of well-known functions and configurations that may make the scope of the present invention unclear in the following description and the accompanying drawings are not provided.

Figure 2:
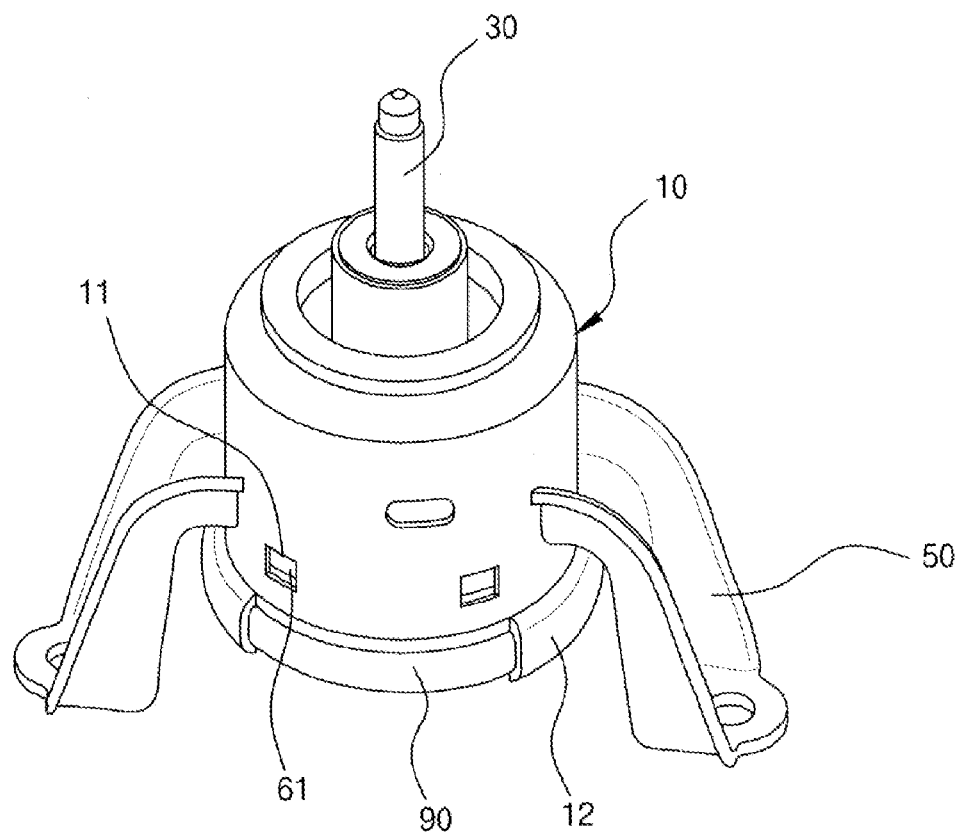
FIG. 2 is a perspective view of an exemplary engine mount of the present invention.
Figure 3:
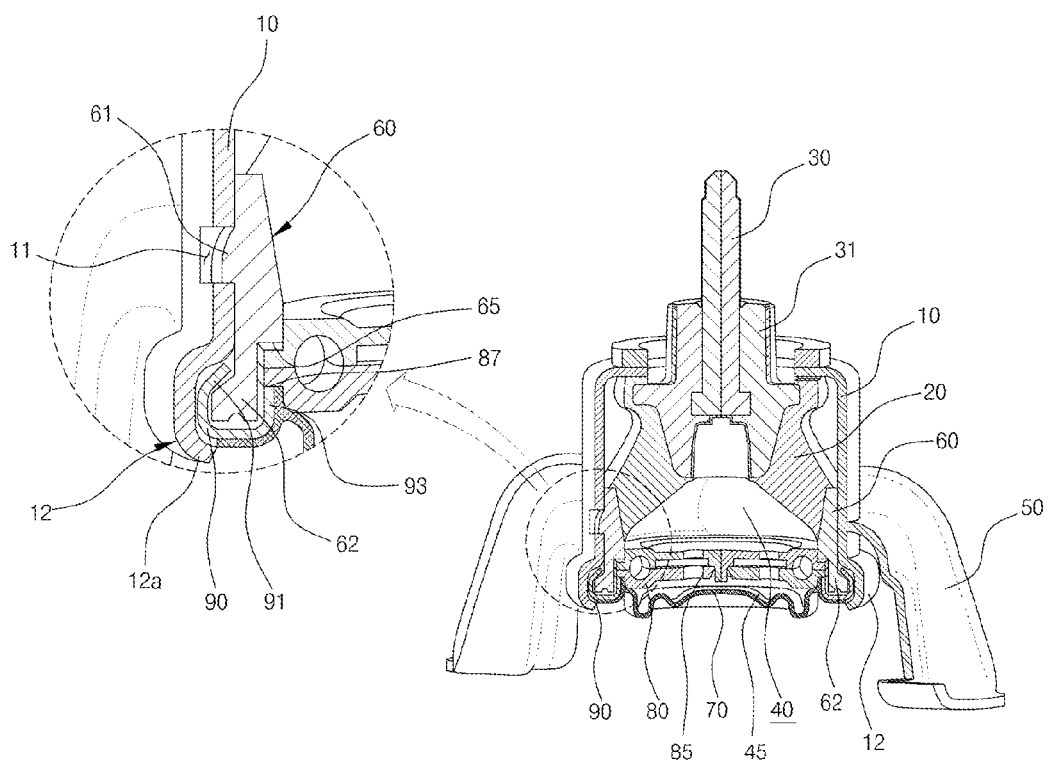
FIG. 3 is a cross-sectional view of the exemplary engine mount of the present invention.

FIG. 2 is a perspective view of an engine mount in an exemplary embodiment of the present invention and FIG. 3 is a cross-sectional view of the engine mount in an exemplary embodiment of the present invention.

An engine amount according to an embodiment of the present invention includes a housing 10 defining the external appearance of the engine mount. A bracket 50 fixing the engine mount to the frame of a vehicle is formed at both sides of the housing 10.

Main components of the engine mount according to an embodiment of the present invention are disposed inside the housing 10. That is, a main rubber body 20 having a main liquid chamber 40 in which fluid flows at the lower portion, a unit 31 attached to the upper portion of the main rubber body 20 and having a fastening bolt 30 for fastening the engine mount to the engine, and an inner case 60 having the main rubber body 20 at the upper portion and locking prominences 62 at the lower portion are disposed in the housing 10.

Further, a nozzle plate 80 that allows the liquid to flow between the main liquid chamber 40 and a supplementary liquid chamber 45 through a nozzle 85 is disposed at the lower portion of the inner case 60.

The inner case 60 may include a locking step 65 at the lower portion thereof and the nozzle plate 80 may be coupled to the locking step 65.

The nozzle plate 80 may include a locking groove 87 along outer circumference thereof.

A diaphragm 70 is attached to the locking groove 87 of the nozzle plate 80. In this configuration, the diaphragm 70 according to an embodiment of the present, invention is a vulcanized integral diaphragm with a ring plate 90 attached to the circumference.

The supplementary liquid chamber 45 may be formed between the diaphragm 70 and the nozzle plate 80.

A first hook 91 and a second hook 93 bending upward are formed at the end of the ring plate 90 attached to the diaphragm 70.

The ring plate 90 with the first and second hooks 91 and 93 is a member for combining the diaphragm 70 and the nozzle plate 80 with the inner case 60. The diaphragm 70 and the nozzle plate 80 are combined with the inner case 60 by inserting the locking prominence 62 at the lower end of the inner case 60 inside the first and second hooks 91 and 93 of the ring plate 90, wherein the second hook 93 is coupled into the locking groove 87 of the nozzle plate 80.

Since the engine mount employs the vulcanized integral diaphragm 70 with the ring plate 90, it is possible to basically prevent water or pollutants from flowing into the lower portion of the diaphragm 70.

Further, the inner case 60 has at least one or more protrusions 61 along the outer circumference and the housing 10 has at least one or more insertion groove 11 at positions corresponding to the protrusions 61. The protrusion 61 and the insertion grooves 11 are used for assembly of the engine mount, which is described below.

In the present embodiment of the present invention four insertion grooves 11 are formed in the housing 10 to increase combination strength and four protrusions 61 that are inserted into the insertion grooves 11 are formed in the inner case 60.

Further, a curling portion 12 having a support prominence 12a formed by horizontally bending the end is formed at the lower portion of the housing 10. The curling portion 12, as described below, more firmly fixes the engine mount.

The assembly process of the engine mount having the above configuration according to an exemplary embodiment of the present invention is described with reference to FIG. 3.

First, the inner case 60 temporarily assembled with the nozzle plate 80 with the main rubber body 20 attached to the upper portion thereof and the diaphragm 70 attached to the lower portion thereof.

Thereafter, the housing 10 is placed from above the inner case 60 and then combined with the inner case 60 in a cocking way by inserting the protrusions 61 of the inner case 60 into the insertion grooves 11 of the housing 10.

Further, in addition to the cocking combination of the insertion grooves 11 and the protrusions 61 described above, the housing 10 is combined once again with the inner case 60 by inserting the ring plate 90 combining the diaphragm 70 and the nozzle plate 80 with the inner case 60 into the curling portion 12 formed at the lower portion of the housing 10 such that the outside of the ring plate 90 is locked to the support prominence 12a of the curling portion 12.

Therefore, according to the engine mount, as described above, since the housing 10 is firmly combined with the inner case 60 two times by inserting the protrusions 61 into the insertion grooves 11 and inserting the ring plate into the curling portion 12, the engine mount is not easily separated by an external shock, such as a collision of vehicles.

Further, since the lower end of the housing 10 forms the curling portion 12, there is no gap that allows water etc. to flow inside, such that it is possible to preclude corrosion of the lower end of the housing 10 and the bracket 50.

Although the configuration of an engine mount according to an embodiment of the present invention was described above with reference to the accompanying drawings, the present invention may be changed, modified, and substituted by those skilled in the art and the change, modification, and substitution should be construed as being included in the protective scope of the present invention.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine mount of a vehicle comprising:
   a main rubber body defining a main liquid chamber, wherein a fastening bolt for assembling a vehicle engine is coupled to the main rubber body;
   an inner case supporting the main rubber body; and
   a housing enclosing the main rubber and the inner case;
   wherein at least a protrusion is formed on an outer circumference of the inner case;
   wherein at least a groove is formed in the housing and the at least a protrusion of the inner case is coupled to the corresponding at least a groove of the housing; and
   wherein a curling portion having a support prominence is, at a lower portion of the housing, formed by bending a distal end of the housing inwards, and a diaphragm is locked to the support prominence of the curling portion and the inner case.

2. The engine mount of a vehicle according to claim 1, further comprising a nozzle plate including a nozzle to allow fluid to flow between the main liquid chamber and a supplementary fluid chamber formed between the diaphragm and the nozzle plate, wherein the nozzle plate is attached to a lower portion of the inner case and the diaphragm is attached to a lower portion of the nozzle plate to form the supplementary fluid chamber.

3. The engine mount of a vehicle according to claim 2, wherein a ring plate is attached to an outer circumference of the diaphragm, encloses a distal end of the inner case and is locked between the support prominence of the curling portion and the inner case.

4. The engine mount of a vehicle according to claim 3, wherein a locking prominence is formed at the lower portion of the inner case,
   the ring plate includes a first hook bending upwards and then bending inwards, and
   the diaphragm connected to the ring plate are coupled to the inner case by inserting the first hook of the ring plate between the support prominence of the housing and the locking prominence of the inner case.

5. The engine mount of a vehicle according to claim 4, wherein the locking prominence is formed to extend outwards toward the curling portion of the housing in a predetermined length.

6. The engine mount of a vehicle according to claim 4, wherein the ring plate includes a second hook protruding upwards and the nozzle plate includes a locking groove along an outer circumference thereof into which the second hook of the ring plate is coupled.

7. The engine mount of a vehicle according to claim 2, wherein the inner case includes a locking step at the lower portion along an inner circumference thereof and the nozzle plate is coupled to the locking step of the inner case.

8. The engine mount of a vehicle according to claim 1, wherein at least a bracket that is fixed to a frame of the vehicle is formed at the housing.

* * * * *